United States Patent [19]

Nickola et al.

[11] Patent Number: 4,542,048

[45] Date of Patent: Sep. 17, 1985

[54] POWDER METAL AND/OR REFRACTORY COATED FERROUS METALS

[75] Inventors: Richard A. Nickola, Highland; Brian A. Sok, Cedar Lake; Shashi B. Agarwal, Griffith, all of Ind.

[73] Assignee: Inland Steel Company, Chicago, Ill.

[21] Appl. No.: 511,570

[22] Filed: Jul. 7, 1983

[51] Int. Cl.$^4$ .............................. B05D 3/02
[52] U.S. Cl. ........................ 427/380; 148/6; 148/6.14 R; 148/627; 427/383.7; 427/383.9; 427/386
[58] Field of Search .............. 427/380, 383.7, 383.9, 427/386; 148/6, 6.14, 6.27

[56] References Cited

U.S. PATENT DOCUMENTS

| | | | |
|---|---|---|---|
| 2,289,614 | 7/1942 | Wesley et al. | 148/12 |
| 3,051,586 | 8/1962 | Heath et al. | 252/29 X |
| 3,059,326 | 10/1962 | Jominy et al. | 29/196.2 |
| 3,134,685 | 5/1964 | Dravnieks | 427/383.9 X |
| 3,881,880 | 5/1965 | Gomersall | 29/196.2 |
| 3,954,460 | 5/1976 | Nickola | 75/208 CS |
| 4,228,203 | 10/1980 | Yagi et al. | 427/383.9 X |

FOREIGN PATENT DOCUMENTS

1391659 2/1965 France .

Primary Examiner—Thurman K. Page
Attorney, Agent, or Firm—Marshall, O'Toole, Gerstein, Murray & Bicknell

[57] ABSTRACT

Coatings of a powdered protective metallic material or refractory material and mixtures thereof are formed on a ferrous metal strip as a wet film dispersion in a resin binder composition of a synthetic organic resin and a volatile organic solvent compatible with said resin, and the coated strip is heated to effect curing said resin binder and forming a flexible non-tacky dry film. The metal strip having the cured dry film containing powdered protective metallic material can be subjected to varying heat treatments to provide a wide range of protective coatings having improved surface properties, including iron-protective metal diffusion alloy coatings, such as iron-aluminum diffusion alloy coatings having a surface concentration of aluminum between about 8 and about 10 wt. percent aluminum, which have improved high temperature oxidation resistance after being severely strained during fabrication at room temperature.

13 Claims, 8 Drawing Figures

POWDER METAL AND/OR REFRACTORY COATED FERROUS METALS

The present invention relates generally to protective coatings of finely divided material on an article having a ferrous metal base, and more particularly to a method of providing on the surface of a metal strip having a ferrous metal base a wide range of improved protective coatings of finely divided metallic and non-metallic refractory material dispersed in a resin binder and to the said coated ferrous metal strip after exposure to varying amounts of heat and processing conditions which produce a wide range of coating compositions and surface properties.

Coatings containing finely divided metallic or non-metallic refractory material have heretofore been applied to ferrous metal strips by various methods to improve the resistance of the ferrous metal to oxidation, corrosion and similar stresses, to improve appearance, or to impart other useful properties, such as paintability or weldability to a ferrous metal strip.

It has been proposed, for example, to form coatings of finely divided material on a ferrous metal base by applying a suspension of finely divided metal in a volatilizable organic material which serves as a carrier for the particles and to temporarily bind the particles on the metal strip until the strip is heated in a non-oxidizing atmosphere to effect removal of the organic binder (U.S. Pat. No. 2,289,614). A film coating of a volatilizable organic material has also been used as the adhesive layer for particles which are dusted thereon, followed by compacting and heating sufficiently to form a sintered or diffusion coating (U.S. Pat. No. 3,954,460).

It is an object of the present invention to provide an improved coated ferrous metal article and process of forming a ferrous metal article having a protective surface coating of finely divided metallic or non-metallic refractory material dispersed in a resin binder which is flexible at ambient temperatures and provides dry coatings which are free of distortions and bulges over a wide range of coating thickness.

It is also an object of the present invention to provide an improved process of forming a ferrous metal strip having a protective metallic or non-metallic refractory surface coating which contains mainly finely divided metallic a non-metallic refractory material directly bonded to the ferrous metal strip and characterized by good adherence and formability at room temperature and being free of distortions and bulges over a wide range of coating thicknesses.

It is a still further object of the present invention to provide a ferrous metal strip having an improved solid solution iron-protective metal diffusion alloy surface coating formed directly on the surface of said ferrous metal strip which is characterized by good ductility, good formability at room temperature, good mechanical strength, and good high temperature oxidation resistance and to the process of forming the solid solution iron-protective metal diffusion alloy surface coating.

It is also an objection of the present invention to provide a process of providing on the surface of a low alloy steel strip containing a strong oxide former as an essential alloying element an improved protective coating.

Other objects of the present invention will be apparent to those skilled in the art from the detailed description and claims to follow when read in conjunction with the accompanying schematic diagram, graphs, photographs and photomicrographs which comprise the drawing, wherein

The objects of the present invention are achieved by first providing on the clean surface of an endless ferrous metal article, such as a low carbon steel strip, a wet film coating comprising a finely divided protective metallic material, such as powdered metallic aluminum or a mixture of powdered zinc and aluminum, or a finely divided non-metallic refractory material, such as a porcelain enamel frit, uniformly dispersed in a fluid resin binder-solvent composition adapted to form on heating to remove the solvent and set the resin a dry film which is adherent to the metal strip, formable at room temperature and non-tacky at ambient or room temperature. The steel strip having the cured powder-resin coating is particularly adapted for making structures or articles which require deformation of the coated steel strip during fabrication at room temperature. And, in a further embodiment of the invention a cured resin-powder metal coated strip is adapted to be further heated to an elevated temperature before fabrication to effect removal of the resin and formation of a sintered or solid solution iron-protective metal diffusion alloy surface coating having improved room temperature formability and good high temperature oxidation resistance after being subjected to severe deformation during fabrication; whereby the coated steel strip is particularly useful for making articles which in service are heated in an oxidizing atmosphere to an elevated temperature.

According to one embodiment of the present invention an improved formable adherent coating of finely divided protective coating material, such as a powdered metallic material or powdered refractory material, can be provided on the surface of a ferrous metal base, such as a cold rolled low carbon steel strip, by roll coating the steel strip with the finely divided metallic or refractory material uniformly dispersed in a fluid thermoplastic resin binder composition comprised of a volatilizable thermoplastic synthetic organic resin solubilized with a readily volatilizable organic solvent compatible with the resin so as to form a stable uniform fluid suspension of the finely divided protective coating material in the resin binder compositions.

The thermoplastic resins useful in forming compositions adapted to serve as the carrier and binder for the powder metal or ceramic particles on the surface of a ferrous metal base strip must have a hardness factor at ambient temperatures which provides a solid, flexible non-tacky, adherent coating on the surface of the steel strip after removal of the solvent. The thermoplastic resin also should preferably be removable from the coating by volatilizing or decomposing into gaseous products without leaving an objectionable residue on the steel strip when the coated strip is heated at an elevated temperature and should disintegrate completely even in an inert or reducing atmosphere when heated at a sintering or diffusion temperatures, such as 816° C. (1500° F.) and above, without leaving a significant residue in the coating. For example, the resin binder should be substantially volatilized (i.e. at least 90 percent of the resin should be volatilized) when the strip is heated in air at a temperature ranging between 340° C.–535° C. (644° F.–995° F.). The thermoplastic resins should have a Tukon hardness value between about 10 and about 22 and preferably between about 10–15 when the powder-resin coating is to be used in the "cured" state but can be between about 15 and 22 when the cured powder-resin coating is directly heated to form an article having an iron-metal diffusion alloy surface coating. The thermoplastic resins should also have a Glass Transition point (i.e. softening point) within a range from slightly above ambient or room temperature (i.e. about 35° C.) to about 180° C. so as to provide a dry, flexible coating which exhibits the degree of flexibility required for processing and handling without being tacky at ambient temperatures.

Thermoplastic resins which have the foregoing properties include the acrylic alkyl ester resins and bisphenol-A based resins such as phenoxy resins made from bisphenol-A and epichlorohydrin having a molecular weight between about 20,000 and 35,000. Suitable phenoxy type resin are the Bakelite ® phenoxy resins produced by Union Carbide Corporation, such as Bakelite Resin PKHH, having a molecular weight between about 25,000 and 30,000 and an apparent glass transition temperature between about 100° C. (212° F.) and 170° C. (338° F.). When the phenoxy resin Bakelite ® Resin PKHH is heated for 5 minutes at 890° F. or 15 minutes at 800° F. in an oxidizing atmosphere, 92 percent and 93.6 percent, respectively, of the resin is volatilized. Among the thermoplastic acrylic alkyl ester resins which are particularly adapted for use in the present invention are methyl methacrylate copolymer, ethyl methacrylate copolymer, methyl-butyl methacrylate copolymer, isobutyl methacrylate polymer and ethyl methacrylate copolymer. The preferred acrylic alkyl ester resin is ethyl methacrylate copolymer (Acryloid B-72), a product of the Rohm and Haas Company, and has a density of 1.15 g/cc, a Glass Transition temperature (i.e. softening point) of 40° C. (104° F.) and a Tukon Hardness of 10–11. When Acryloid B-72, is heated for 10 minutes at 600° F. or for 5 minutes at 700° F., 93 percent of the resin is volatilized.

Other synthetic organic resins which have properties similar to the herein disclosed thermoplastic resins can be used to form the resin binder composition for the powder coatings. For example, thermosetting polyester resins and mixtures of thermoplastic and thermosetting resins, such as a mixture of acrylic and epoxy resins, which have similar properties to the disclosed thermoplastic resins and which exhibit a degree of polymerization and cross-linking to form a flexible, non-tacky coating at ambient or room temperature after heating to effect volatilization of the solvent for the resin from the coating can be used to form the resin binder.

Among the suitable organic solvents for admixing with the thermoplastic acrylic alkyl ester resins and the phenoxy resins is Cellosolve acetate (2-ethoxyethyl acetate) which is used in an amount required to form a fluid composition having a viscosity to provide a coating of the desired thickness when used in the selected coating procedure. Other volatile organic solvents which are preferably adapted to be removed by heating at a temperature between about 30° C. and about 274° C. (80° F.–525° F.) and which have similar properties can be used, such as methyl ethyl ketone, methyl isobutyl ketone, methyl Cellosolve acetate or commercially available solvent blends (i.e. the mixture Cellosolve acetate-Cellosolve solvent-methyl ethyl ketone).

The finely divided or powder protective metal coating materials which can be used in the present invention include: zinc, iron-zinc mixtures and alloys, aluminum, aluminum-zinc mixtures and alloys, aluminum-silicon mixtures or alloys, iron-aluminum mixtures and alloys, copper, brass, bronze, cupro-nickel mixtures and alloys, duronickel, nickel-chromium mixtures and alloys, iron-chromium mixtures and alloys and stainless steel. Fillers and protective pigments, such as hexavalent chromium compounds, can also be added to a powder protective metal coating material of the present invention to control welding properties, improve salt fog corrosion resistance and impart other desirable properties to the protective coating.

The finely divided non-metallic refractory coating materials which can be applied to a ferrous metal strip in accordance with the present invention include finely ground ceramic materials, such as an enamel ground coat, an enamel frit, porcelain enamel frit, glass frit (ground coat) and similar finely divided refractory materials normally used to form protective or decorative coatings on a ferrous metal strip or sheet by heating the coating to a fusion or sintering temperature. Powdered metal can also be mixed with the finely divided ceramic material to form cermet-resin coatings and sintered cermet coatings.

The powdered protective metallic or refractory material suspended in a fluid resin binder composition can be applied to a ferrous metal strip by any suitable coating procedure, including spray coating, immersion coating and roll coating.

Where the powder coated steel strip is to be used in the dry or "as cured" form (i.e. heated sufficiently to remove the solvent but without removal of the resin), the cured coating typically has a composition of about 50 percent by volume resin, such as the preferred thermoplastic acrylic alkyl ester resins or phenoxy-type resins, and about 50 percent by volume of finely divided coating material, such as powdered metallic aluminum. Higher concentrations of metal powder or refractory powder can be used where deep drawing properties are not required in the coated strip or where the cured or dry resin-powder coating is heated to form an iron-protective metal diffusion alloy surface coating. Where the coated steel strip is intended to be provided with a sintered or single phase iron-protective metal diffusion alloy surface coating, the coating solution should preferably contain about 12 to 20 percent by volume resin and 80 to 88 percent by volume powder on a solvent free basis. The formability and corrosion or oxidation protection provided by the coatings depends on the coating composition, the coating thickness and the conditions used to process the coating.

The steel base commonly used in the present invention is a cold rolled low carbon steel, and preferably but not necessarily an aluminum killed steel, which has a carbon content not above about 0.25 weight percent maximum and preferably having between about 0.001 weight percent carbon to about 0.1 weight percent carbon. An aluminum killed low carbon steel will generally contain between about 0.01 to 0.08 weight percent carbon, about 0.3 to 0.8 weight percent manganese, a maximum of about 0.03 weight percent sulfur, a maximum of about 0.015 weight percent phosphorus, about 0.05 weight percent silicon, a maximum of about 0.10 weight percent aluminum, and the balance being essentially iron with the usual amounts of residual impurities. If the steel is vacuum degassed, the concentration of all metalloids and residuals in the steel are maintained at a very low level. A typical low-carbon aluminum killed steel which can be used in the present invention is a cold rolled steel strip having the following approximate composition on a weight basis: Carbon 0.05 percent, Manganese 0.25–0.50 percent, Sulfur 0.030 percent, Phosphorous 0.02 percent, Silicon 0.05 percent, Aluminum 0.030 percent, to 0.090 percent, and the balance essentially iron and incidental impurities.

The present invention is particularly useful for providing a uniform aluminum coating on a low carbon aluminum killed steep strip which contains as an alloying element, a small amount of a strong oxide forming metal, such as titanium, in an amount between about 0.1 wt. percent and about 1.0 wt. percent. Low carbon low alloy steels containing strong oxide formers as the essential alloying element are difficult to provide with a continuous, uniform, hot-dip aluminum coating which has good resistance to high temperature oxidation and/or corrosion by conventional continuous coating procedure.

The surface of a steel strip to be coated must be thoroughly cleaned by any conventional methods of removing rolling oils and other contamination from the surface of the steel strip before coating the strip with the powder-resin material of the present invention. More particularly the strip can be cleaned with a degreasing solvent and/or by applying an alkaline cleaning solution and brushing. The cleaning solution is preferably heated to a temperature of between about 65° to 80° C. (149° F. to 176° F.). Any conventional cleaning brush can be used, such as a Scotch-Brite brush, and the brushing can be carried out using either hot water or heated alkaline cleaning solution. After alkaline cleaning the surface of the steel strip, the strip is thoroughly rinsed and dried before coating the strip with the powdered metal-thermoplastic resin binder composition.

As a specific ilustration of producing a cured powder metal-resin coated steel strip by the process of the present invention, a strip of cold rolled aluminum killed low carbon steel having a carbon content of 0.05 wt.%, a thickness of about 2 mm. and a width of about 1050 mm was continuously immersed in an alkaline cleaning bath while travelling at a line speed of about 0.60 meters per second. The alkaline cleaning bath contained about 15 mg per liter (2 oz. per gal.) "Parker 356 Cleaner" heated to a temperature of between 60° C.–77° C. (150° F.–170° F.). The strip leaving the alkaline cleaning bath was then continuously wet brushed with a Scotch-Brite brush operating at 75% of full load capacity. The strip was again passed through an alkaline cleaning bath of identical composition and temperature and thereafter spray rinsed with water at a temperature of 16° C.–27° C. (60° F.–80° F.), and dried with an air knife at 60° C. (140° F.). In some runs the strip was contacted with a 3% aqueous solution of $H_2SO_4$ at about 47° C. (115° F.) before the final rinse.

The clean strip was roll coated in a conventional manner with a fluid coating composition prepared by dispersing aluminum metal powder (Reynolds-115) having an average particle size of about 9–13 microns uniformly in a thermoplastic resin binder composition in amounts which provide after curing a dry film composed of about 67 wt. percent (about 48 volume percent) aluminum metal powder and about 33 wt. percent (about 52 volume percent) thermoplastic resin. The thermoplastic resin binder composition was formed of ethyl methacrylate copolymer (Acryloid B-72, a product of the Rohm & Haas Company), containing Cellosolve acetate solvent in a ratio of 40 grams resin to about 170 ml. (6 oz.) solvent to provide a coating composition having a viscosity of 0.57 Pa.S (43 seconds #4 Zahn) and having 38.2 percent volume total solids. The ethyl methacrylate copolymer resin had a Tukon hardness value of about 10-11, and a Glass Transition temperature of about 40° C. The solvent was admixed to adjust the viscosity of the composition to provide the desired coating thickness for the roll coating line and the ratio of metal powder to resin was selected to provide the desired concentration of metal in the coating.

The foregoing powdered aluminum-resin binder fluid coating composition was applied to both surfaces of the strip by conventional roll coating procedure at a first coating station and the coating cured in the first heating oven where the strip was heated at a temperature ranging between about 177° C. and 279° C. (350° F. and 535° F.), and preferably to a peak metal temperature between 207° C. to 212° C. (405° F. to 415° F.) as measured at the exit end of the heating oven to effect complete removal of the volatile Cellosolve acetate organic solvent from the coating and set the resin but without removing or degrading the resin binder and providing a cured dry coating having a thickness of about 30.5 μm (1.2 mils). Where the coated strip is to be immediately heat treated in-line to form an alloyed surface coating, as hereinafter described, the resin coated strip need not be heated to a temperature of 207° C. but only heated sufficiently to substantially remove the solvent (i.e. as low as about 150° C.). Thereafter, during this run the viscosity of the coating system was reduced by adding to the coating bath an amount of Cellosolve acetate solvent which provided in the above manner coated material having a dry coating thickness of about 20.0 μm (0.8 mils). Similar coating solutions were prepared which provided coatings having a dry coating thickness from about 12.7 μm (0.5 mil) to 50.8 μm (2.0 mil). The stability of the fluid powdered aluminum coating systems was excellent, since the coating compositions were used over an 8 hour period without any separation problems occurring. During the foregoing runs no problems were noted in applying the aluminum coating to the surfaces of the steel strip by the roll coating procedure.

As a further example of producing a cured powder metal-resin coated low titanium alloy low carbon steel, a low-carbon aluminum killed full hard steel strip containing about 0.3 wt.% carbon and about 0.4 wt.% metallic titanium with 0.09 wt.% percent aluminum and the usual amounts of manganese, sulfur, phosphorous, silicon and incidental impurities was cleaned and roll coated in the following manner. Prior to the run, the resin binder (R&H Acryloid B-72) and the solvent (Cellosolve acetate) were mixed in the ratio of 195 g of binder to 1 dm$^3$ of solvent (1.625 lbs of binder to 1 g of solvent), and 110 dm$^3$ (29 gal) of the binder/solvent solution were put in a 208 dm$^3$ (55 gal) drum along with 154 kg (340 lb) of aluminum metal powder (Reynolds Aluminum R-400). The binder/solvent solution and aluminum powder were thoroughly mixed in the drum before pumping the dispersion into the roll coating pans. The viscosity of the dispersion was adjusted with Cellosolve acetate to 0.26–0.30 Pa S (21–24 seconds #4 Zahn). After adjustment, the wet film coating mixture contained 42.0% total volume solids. The preferred dry film coating which is formed after removal of the solvent contains 90.1 wt.% aluminum powder and 9.9 wt.% binder (i.e. 90:10 ratio) and has a dry film thickness of 22.9 μm (0.9 mils). Before roll coating the steel strip was cleaned using the following sequence: (1) Alkaline spraying with a 1.21 kg/m$^3$ (2.5 oz/gal) solution of "Parker No. 338" cleaner at 65.5° C. (150° F.); (2) wet brushing; (3) Alkaline spraying with a 0.997 kg/m$^3$ (2.0 oz/gal) solution of "Parker No. 338" cleaner at 65.5° C. (150° F.); (4) Pickling with a 3% aqueous H$_2$SO$_4$ solution at 47.7° C. (118° F.); (6) Rinse spraying with water at 60° C. (140° F.); and (7) Drying.

The aluminum powder coating was applied by roll coating two sides of the strip at the finish coater station and then drying and curing the coating. Temperature tapes, contact pyrometer and Ircon infrared instrumentation were used to control the oven temperature to obtain a peak metal curing temperature suitable for processing and acceptable coating adhesion. Depending on line conditions, peak metal temperatures between 193.3° C. and 210° C. (380° F.–410° F.) and preferably at about 207° C. were maintained during the processing as measured by the Ircon using an emissivity setting of 0.73.

During setup for the run, it was noted that coating transfer occurred at the first support contact roll on the bottom side of the strip after the curing oven. This was caused by inadequate cooling time prior to contact with the roll. Therefore, the coating on the strip bottom side was limited to a maximum thickness of 38.1–40.6 μm (1.5–1.6 mils) wet film thickness which provided a 25.4 μm (1.0 mil) dry film thickness. Water sprays were applied to the bottom side of the strip to eliminate coating transfer to the contact roll after the curing oven. Dry coatings between about 12.7 μm (0.5 mil) and 38.1 μm (1.5 mil) were produced in the foregoing run.

A powder metal-resin coated steel strip having a composition similar to a "Zincrometal" coating (i.e. a zinc-chromate product of the Diamond Shamrock Corporation of Cleveland, Ohio) was also produced by roll coating as described herein using as the powder material a mixture of metallic zinc powder and chromium oxides (CrO$_3$/Cr$_2$O$_3$) powder which was mixed with Acryloid B-72 thermoplastic resin in a proportion of about 86 wt. percent of the zinc-chromate powder mixture to about 14 wt. percent of the thermoplastic resin, such as Acryloid B-72.

A ferrous metal strip can also be provided with a multiple powdered metal coating comprising a prime or under coating of one powdered metallic material, such as zinc, and a finish or surface coating of second powdered metallic material, such as aluminum. The ferrous metal strip is cleaned as described herein or in any conventional manner and provided with the first coating comprising a suspension of powdered metallic zinc in a thermoplastic resin, such as ethyl methacrylate copolymer, having the above specified properties in a ratio of about 70 wt.% (about 50 volume percent) powdered zinc and about 30 wt.% (about 50 volume percent) resin on a dry basis, and containing sufficient Cellosolve acetate solvent to reduce the viscosity sufficiently to permit forming a uniform fluid suspension of the powdered zinc, and applying the fluid suspension to an endless low carbon cold rolled steel strip by roll coating to provide a dry coating having a thickness of about 15.2 μm (0.6 mils) after heating at a peak temperature between 207° C.–212° C. (405° F.–415° F.) to remove the solvent and effect curing. The powdered zinc coating is smooth, non-porous ductile and provides good salt fog resistance. A powdered aluminum metal coating is applied directly to the dry zinc coating in the same manner as previously described for applying a powder aluminum coating followed by heating at a peak temperature of between 177° C. and 279°C. (350° F. and 525° F.) to remove the solvent and set or cure the resin in the outer coating. The coatings can be temper rolled to provide a smooth impervious surface having good oxidation resistance.

An improved protective refractory coating is also provided on a clean surface of a steel panel or strip by the process of the present invention using a fluid suspension comprising a dispersion of finely divided glass frit, Acryloid B-72 resin, and Cellosolve acetate solvent so as to provide after removal of the solvent a thin dry coating having a thickness between about 15.2 μm (0.6 mil) and about 30.5 μm (1.2 mil). By roll coating a steel strip using a resin to glass frit ratio of about 35 parts by wt. of the resin to 65 parts by wt. glass frit followed by applying a conventional white enamel top coating and firing at a temperature of 1460° F. for 4 minutes a composite refractory coating is formed which passes the Olsen Button Test with a rating of about 10, where "O" represents 100% coating removed after taping and "10" represents no coating removed after taping. The glass frit containing the following ingredients is prepared by heating the following several specified ingredients or their equivalents to a temperature of about 1010° C. (1850° F.) for about 5 minutes, quenching in water, and grinding to a very fine powder:

| | | |
|---|---|---|
| | Borax Glass | 52.4 grams |
| | Lead Oxide | 5.3 grams |
| | Calcium Carbonate | 16.0 grams |
| | Barium | 10.9 grams |
| | Alumina ($Al_2O_3$) | 11.0 grams |
| | Sodium Carbonate | 19.8 grams |
| | Silica ($SiO_2$) | 1.7 grams |

The glass frit can also be mixed with metallic aluminum powder or other powdered protective metal in a ratio of about 35 parts by wt. glass frit to about 65 parts by wt. metallic powder, and a suspension thereof in Acryloid B-72 resin applied to a steel panel in the same manner as described herein to provide a formable cermet coating.

In a further embodiment any of the cured resin-metal powder coated strip prepared in the above described manner can be subjected to a relatively low temperature heat treatment in open coil form in an annealing chamber having an oxygen containing atmosphere, such as air, wherein the strip can be heated at a temperature as high as 649° C. (1200° F.) but generally not above about 482° C. (900° F.) and preferably at a temperature of about 427° C. (800° F.) and for a period sufficient to effect substantial removal of the thermoplastic resin binder by volatilizing the resin and without causing formation of a subsurface layer of brittle iron-aluminum intermetallic compound which reduces the formability of the coating to a significant degree. After the strip has been heated in open coil form in the oxygen containing atmosphere to effect removal of the thermoplastic resin binder, the particles of metal, such as aluminum, are joined to each other and to the ferrous metal base by oxide-to-oxide bonds. The formability of the resin-free metal coating can be improved and the oxygen bonds of the ferrous metal base transformed into ferrous metal bonds by purging the oxygen atmosphere in the open coil annealing chamber with nitrogen gas and heating the strip in open coil form in a reducing atmosphere, such as a 5% hydrogen-95% nitrogen atmosphere, at a temperature not above about 482° C. (900° F.) and preferably at about 427° C. (800° F.) to cause the iron oxide on the surface of the ferrous metal strip by ferrous metal bonds without forming a subsurface layer of iron oxide or brittle iron-aluminum intermetallic compound. Any of the powder metal surface coatings produced in the above manner can be temper rolled or cold rolled to effect as much as a 60 percent reduction in coating thickness and provides a surface coating after cold rolling having a smooth impervious surface with good ductility and formability.

Figure 1:
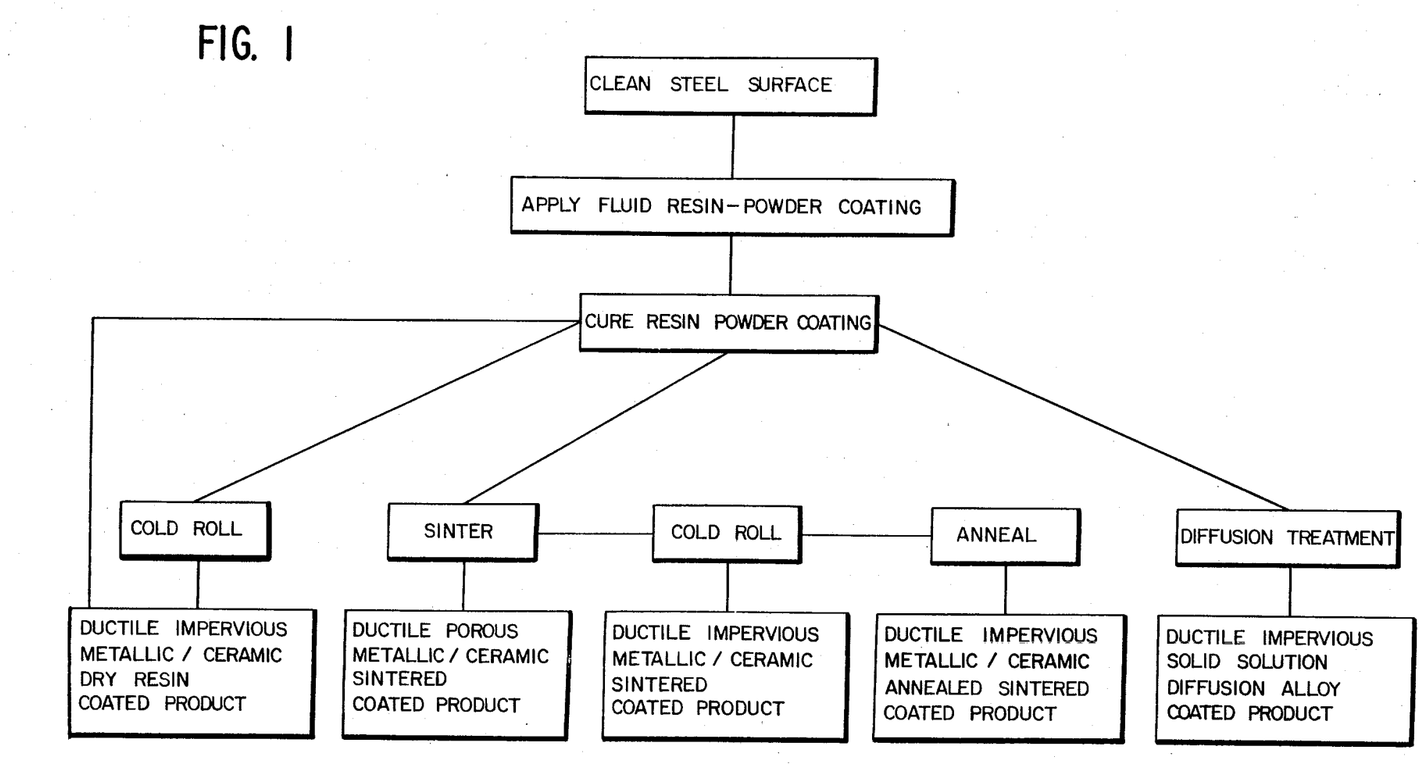
FIG. 1 is a schematic diagram of the procedural steps used to produce the several products of the present invention.

The flexible cured resin-metal powder coatings of the present invention are specially adapted to being further processed prior to fabrication using various combinations of thermal and mechanical treatments to provide coatings having a wide range of useful properties, including sintered coatings with or without cold rolling and annealing after cold rolling (See FIG. 1). The flexible cured resin-metal powder coatings of the present invention can be sintered at a temperature ranging roughly between 982° C. (1800° F.) and 1093° C. (2000° F.) in a furnace provided with a non-oxidizing atmosphere to prevent oxidation. The sintered resin-free coating on the steel strip is ductile and may be porous. The sintered resin-free coating can be cold rolled to effect up to 60 percent reduction to form a ductile impervious sinter coating. And, where the cold rolling treatment has adversely affected the crystal form of the low carbon steel, the strip can be annealed to provide the desired crystal form in the steel strip.

The resin-protective metal powder coating procedure of the present invention also provides an expedient means of forming solid solution iron-protective powder metal diffusion alloy surface coatings which exhibit improved room temperature formability and good high temperature oxidation resistance. For example, an improved aluminum coated steel product can be provided by roll coating a powder aluminum-resin-solvent wet film onto a low alloy low carbon aluminum killed steel strip, such as a cold rolled low carbon steel strip containing between about 0.001 and 0.25 wt. percent carbon and between about 0.02 and 0.09 wt. percent aluminum, heating the coated strip at a low temperature of between about 150° C. (302° F.) and 210° C. (410° F.) to remove the solvent and form a dry resin-powder aluminum coating (or a dry resin-powder aluminum-powder silicon coating mixture or a dry resin-aluminum/silicon alloy powder coating) and thereafter diffusion heating the dry coated strip in a non-oxidizing atmosphere, such as an inert or reducing atmosphere (i.e. a nitrogen or nitrogen-5% hydrogen atmosphere, respectively) in a batch or continuous annealing furnace at a temperature and for a period sufficient to remove the resin and diffuse the powder aluminum coating into the steel and form a surface layer or coating consisting of a solid solution iron-aluminum diffusion alloy coating which is directly bonded to the steel base and which has a concentration of aluminum in the surface of the diffusion alloy coating of at least about 8 wt. percent aluminum and preferably between about 8 wt.% and about 10 wt.% aluminum.

Whereas iron-aluminum alloys containing as much as 8 wt. percent or more aluminum normally have very little ductility at room temperature, a low carbon steel strip having a thin iron-aluminum diffusion alloy coating made by diffusion heating a powder aluminum-resin coating and having a surface concentration of aluminum between about 8 and about 10 wt. percent aluminum exhibits good room temperature ductility and improved high temperature oxidation resistance when heated in an oxidizing atmosphere after being deformed at room temperature. The ductility of such a diffusion alloy coated steel strip is synergistically dependent upon the ductility of both the alloy diffusion coating and the base steel strip. Thus, optimum ductility in both these regions is needed in order to provide a coated product which has good high temperature oxidation resistance after the diffusion coated strip is subjected to substantial strain during fabrication at room temperature.

The intensity of the diffusion heat treatment to which the strip is subjected can significantly increase the grain size of the steel base and thereby decreases the room temperature ductility and formability of the coated steel so that the high temperature oxidation resistance of the coated strip is significantly reduced when the coated steel is oxidized after deformation at room temperature.

Grain size measurements by the linear intercept method were made on several low titanium alloy aluminum-killed low carbon steel panels after the panels were heated at elevated temperatures in a batch diffusion heat treating chamber and the results are shown in the following Table I:

TABLE I

| Grain Size of Diffusion Heated Ti-Bearing Steel | | |
|---|---|---|
| Temp. | Time (hours) | Grain Size* |
| 816° C. | 30 | #10 ASTM |
|  | 40 | 10 |
|  | 50 | 10 |
| 871° C. | 5 | 9 |
|  | 15 | 9 |
| 927° C. | 5 | 8 |
|  | 15 | 7 |

The panels treated for up to 50 hours at 816° C. (1500° F.) did not show any increase in grain size. Significant grain growth was produced when the titanium alloy steel base was heated in a non-oxidizing atmosphere for 5 and 15 hours at 927° C. (1700° F.) Thus, an optimum diffusion heat treating temperature of about 816° C. (1500° F.) should be used when diffusion heating a powder aluminum coated steel strip for a period of between about 30 and about 50 hours where good room temperature formability is required. Where optimum formability is not required, a higher diffusion heating temperature than 816° C. can be used.

The concentration of aluminum in an iron-aluminum diffusion alloy coating, paarticularly the surface concentration of aluminum,, also has a critical effect on the room temperature formability and the high temperature oxidation resistance of the steel strip coated with an iron-aluminum diffusion alloy. Several titanium-containing aluminum killed low carbon steel panels were prepared by roll coating titanium containing aluminum killed low carbon steel panels with dry resin-powder aluminum (10:90 ratio) coating having a thickness of 18 μm, 25 μm, 37 μm, 50 μm and 125 μm, respectively, and diffusion heating the powder coated panels in a non-oxidizing atmosphere at 816° C. (1500° F.) for 40 hours. The distribution of aluminum and the surface concentration of aluminum in each diffusion coating was determined by electron probe microanalysis and the results plotted in FIG. 2. The surface concentration of aluminum for each diffusion alloy coatings is given in the following Table II:

TABLE II

Figure 2:
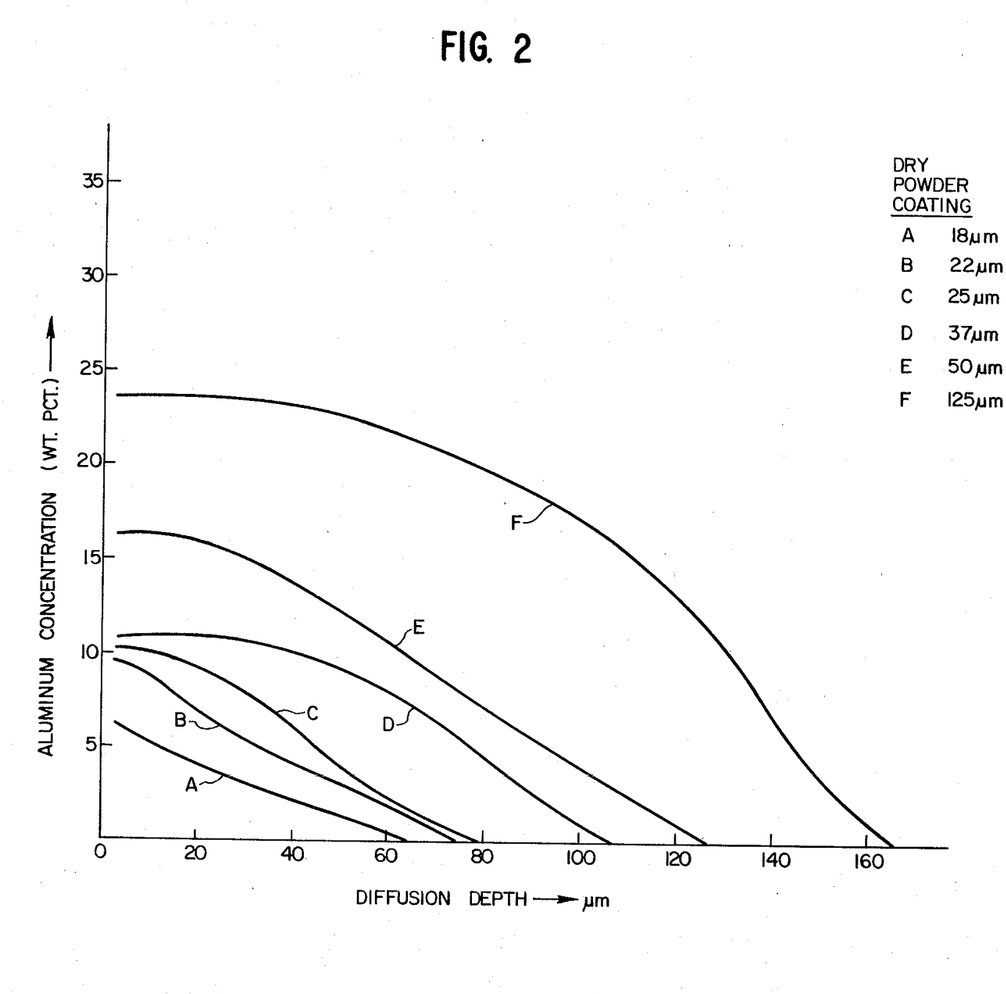
FIG. 2 is a graph showing the surface concentration and distribution of aluminum in several iron-aluminum diffusion alloy coatings formed on titanium-containing aluminum killed low carbon steel panels by diffusion heat treating the panels for 40 hours in a non-oxidizing atmosphere at a temperature of 816° C. (1500° F.) after applying to the panels a dry powder aluminum-resin coating (90:10 ratio) each having a different coating thickness.

| Dry Powder Coating Thickness (μm) | Surface Concentration of Aluminum (wt. %) |
|---|---|
| 18 | 6.25 |
| 22 | 9.5 |
| 25 | 10.25 |
| 37 | 10.75 |
| 50 | 16.25 |
| 125 | 23.5 |

The "surface concentration" of aluminum designates the wt. percent concentration of aluminum in the iron-aluminum diffusion alloy coated panels at a point about 2.5 microns below the surface of the diffusion alloy coating based on electron probe microanalysis data, since a surface film of aluminum oxide forms the outer 1-2 μm an iron-aluminum diffusion alloy coating.

The room temperature ductility of each of the panels of FIG. 2 was determined by subjecting each panel at room temperature to the 7.63 mm (0.3 inch) Olsen Button Coating Thickness Test. The solid solution iron-aluminum diffusion alloy coatings having a surface concentration of aluminum between about 8 and about 10 wt. percent aluminum formed from dry powder aluminum-iron coatings having a maximum thickness of about 25 μm (1.0 mil) showed only minor crazing or cracking in areas of severe deformation where the strain is in excess of about 30 percent strain. The panels with a coating thickness significantly above about 37 μm (1.5 mil) and having a surface aluminum concentration significantly greater than about 10 wt. percent aluminum show extensive cracking.

Where it is necessary to provide an aluminum coated steel strip which must be resistant to crazing and cracking when bent or stamped during fabrication at room temperature and which must exhibit good oxidation resistance at temperatures between about 704° C. (1300° F.) and about 982° C. (1800° F.) after fabrication at room temperature, the surface concentration of aluminum in a solid solution iron-aluminum diffusion alloy coating should be maintained between about 8 and about 10 percent by weight aluminum. When the surface concentration of aluminum in the diffusion alloy coating is significantly below 8 wt. percent, the oxidation resistance of the coated strip is not sufficient to withstand prolonged exposure in an oxidizing atmosphere at elevated temperatures between about 704° C. (1300° F.) and 982° C. (1800° F.). And, when the aluminum concentration in the surface of the solid solution diffusion alloy coating is significantly more than about 10 wt.% aluminum, significant crazing and cracking of the coating is observed in those areas where the coating is severely deformed or severely stressed at room temperature (i.e. subjected to about 30 percent or more strain), as generally occurs during fabrication. Objectionable oxidation of the deformed strip occurs in the areas of significant crazing or cracking when the deformed strip is exposed to a high temperature oxidizing atmosphere, such as motor vehicle exhaust gases. However, where high temperature oxidation resistance is desired but good room temperature formability is not required, as when the coated strip is not significantly deformed at room temperature during fabrication, the concentration of aluminum in the surface of a thin solid solution iron-aluminum diffusion alloy coating can be greater than about 10 wt. percent concentration of aluminum (i.e. up to about 13 wt. percent) in the surface of the iron-aluminum diffusion alloy coating.

The surface concentration of aluminum in a solid solution iron-aluminum diffusion alloy coating on a low carbon steel strip of the type herein disclosed can be controlled by providing a suitable amount of aluminum in the dry powder metal-resin coating and using a controlled diffusion heat treatment to effect diffusion of the aluminum into the steel strip until the required surface concentration of aluminum is provided. Where the powder coating composition has a fixed proportion of metallic aluminum powder to resin and the diffusion heat treatment is maintained constant, the coating thickness will determine the surface concentration of aluminum in the diffusion alloy coating on the steel strip. For example, a dry powder aluminum-resin coating is formed of about 90 parts by weight aluminum powder to about 10 parts by wt. resin (i.e. 90:10 ratio) and having a thickness of about 17 μm (0.7 mil) will provide an iron-aluminum diffusion alloy coating having an aluminum surface concentration of about 8 weight percent aluminum after heating in a non-oxidizing atmosphere for 40 hours at 816° C. (1500° F.), whereas the same dry coating having a thickness of 22 m when heated in the same manner provides an aluminum surface concentration of about 10 wt. percent aluminum.

Figure 3:
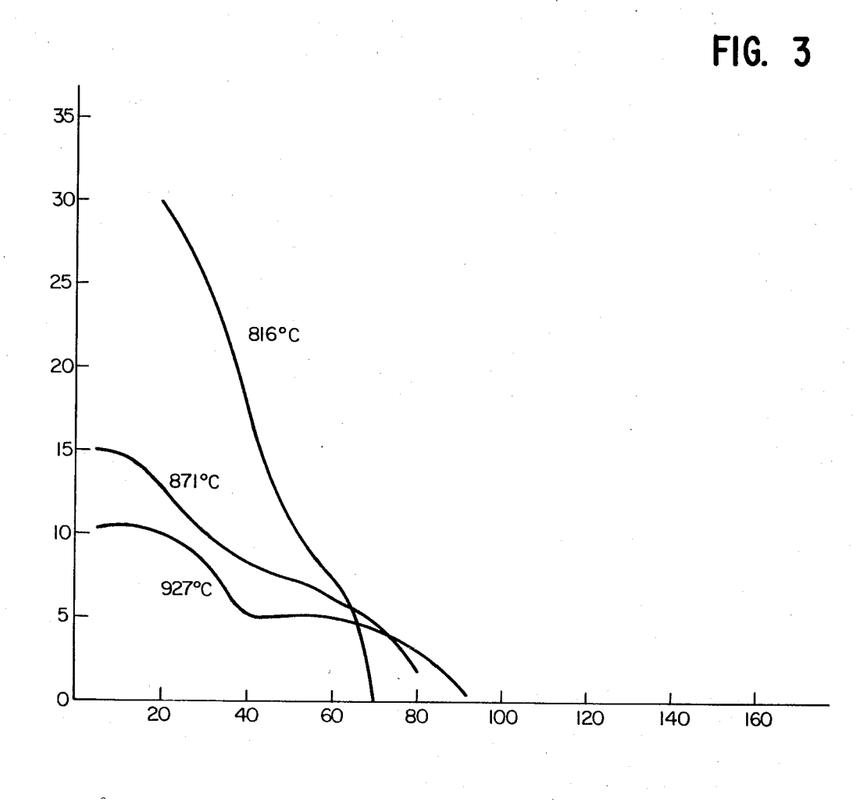
FIG. 3 is a graph showing the surface concentration and distribution of aluminum in aluminum killed low carbon steel panels prepared by heating the panels having a 25 μm thick powder aluminum-resin coating (90:10 ratio) for 15 hours at the indicated temperatures.

The affect which the thickness of a dry powder aluminum-resin coating has on the surface concentration and distribution of aluminum in the iron-aluminum diffusion alloy coating for a given diffusion heat treatment is clearly shown by the data of FIG. 2 which were obtained by subjecting titanium-containing aluminum killed low carbon steel panels having powder aluminum-resin coatings (90:10 ratio) each with a different thickness to the same diffusion heat treatment (i.e. 40 hours at 816° C.). The thicker the dry powder metal coating, the higher the surface concentration of aluminum and the deeper the aluminum is diffused into the steel base (i.e. diffusion coating thickness). If the temperature of the diffusion heat treatment is increased, the surface concentration of aluminum in the diffusion alloy coating is reduced and the aluminum is diffused a greater distance into the steel base (See FIG. 3).

When the time and diffusion heat treating temperature conditions are properly adjusted, a wide range of dry film coating thicknesses can be used to provide the preferred 10 wt. percent aluminum surface concentration in the diffusion alloy coating. However, as a significant increase in the grain size of the steel base is effected by heating the powder coated steel strip at a temperature substantially above 816° C. (1500° F.), the diffusion heat treating temperature preferably should not exceed about 816° C. (1500° F.) where optimum room temperature formability properties are required (See Table I). Where the ratio of powder aluminum to resin in the dry coating is higher than 90:10, the dry coating thickness can be less than the preferred 22 $\mu$m (0.9 mil) coating thickness and still provide the preferred 10 wt. percent aluminum in the surface of the iron-aluminum diffusion alloy coating when using the herein preferred diffusion heat treating conditions.

Figure 4A:
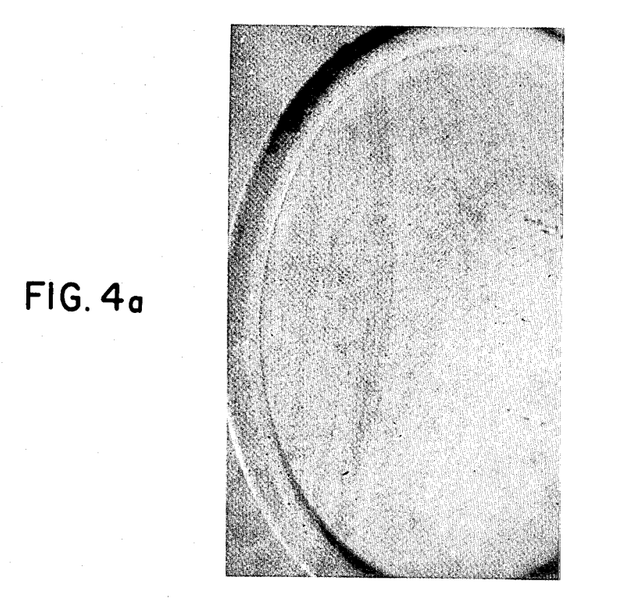
FIG. 4a is a photograph of the surface oxidation produced in a solid solution iron-aluminum diffusion alloy coating having an aluminum surface concentration of 10 wt. percent aluminum and made by diffusion heating a dry resin-powder aluminum coating (10:90 ratio) roll coated on a titanium-containing aluminum killed low carbon steel panel after the diffusion coated panel was severely strained by forming a bulge therein at room temperature in a Bulge Tester and heated in air at a temperature of 816° C. (1500° F.) for a period of 420 hours.
Figure 4B:
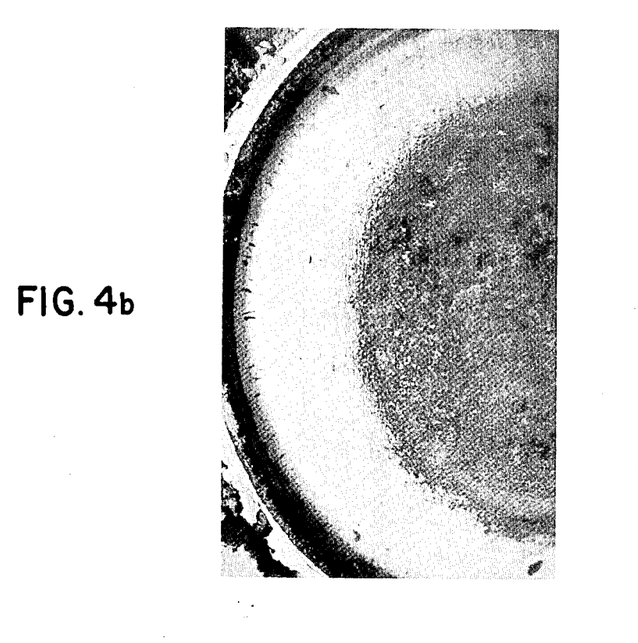
FIG. 4b is a photograph of the surface oxidation produced in a titanium containing aluminum killed low carbon steel panel coated with a conventional hot-dip Type I aluminum coating which was subjected to the same deformation at room temperature in a Bulge Tester as the panel of FIG. 4a and heated in air at a temperature of 816° C. (1500° F.) for a period of 420 hours.
Figure 5:
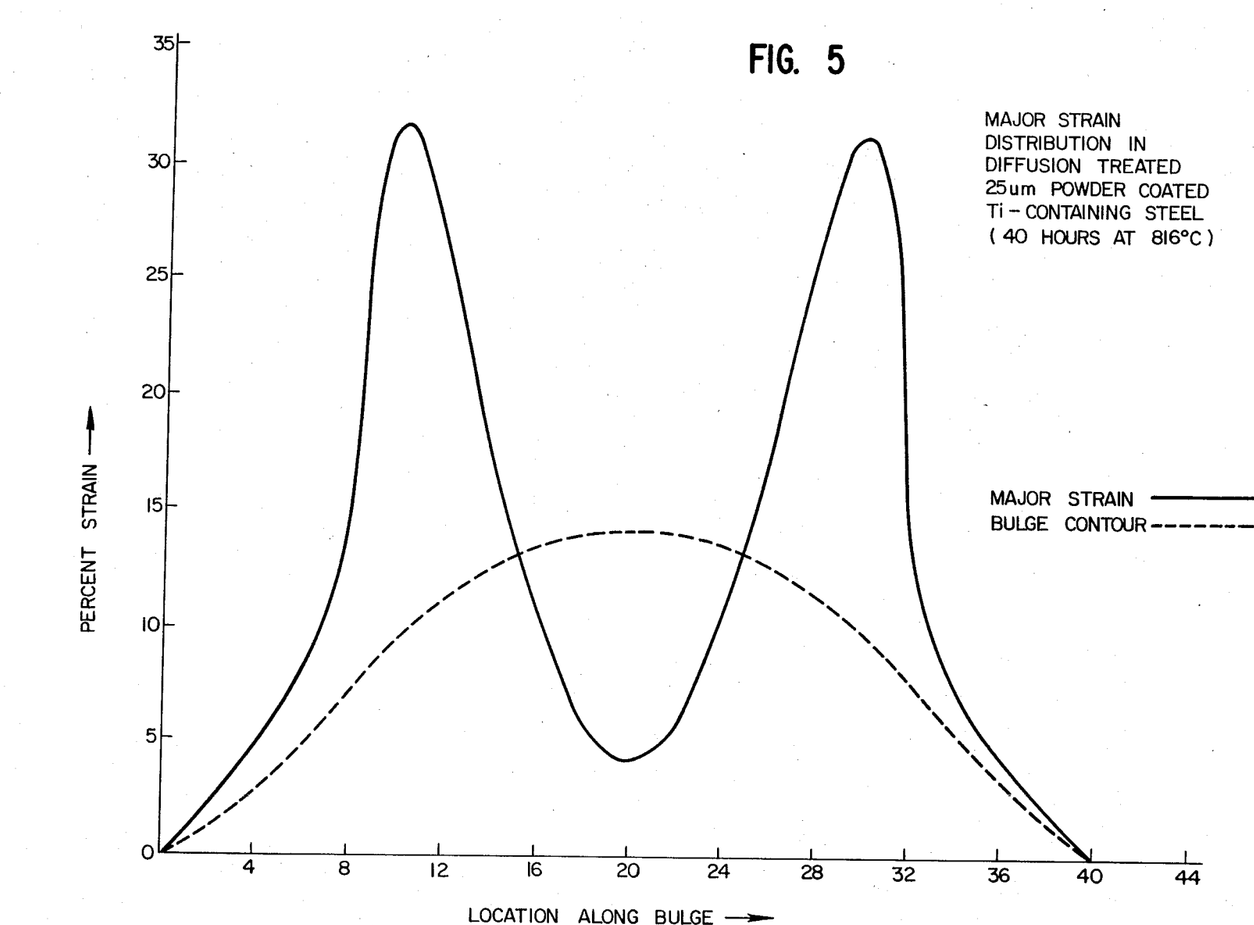
FIG. 5 is a strain diagram of the deformed panel of FIG. 4a having superimposed thereon a cross section of the bulge formed in the panel by the Bulge Tester.

The exceptionally good high temperature oxidation resistance properties of the preferred iron-aluminum diffusion alloy coated titanium-containing aluminum killed low carbon steel strip having all the carbon combined with titanium and a surface concentration of about 10 wt. percent aluminum when made by diffusion heating a dry resin-powder aluminum coating is shown in FIG. 4 where the oxidation resistance properties of the low carbon steel strip having an iron-aluminum diffusion alloy coating (FIG. 4a) is compared with an identical steel strip having a hot-dip metallic aluminum Type I coating (FIG. 4b) after each of the coated strips was deformed at room temperature in a Bulge Tester. In conducting the test flat discs of each of the foregoing coated strips were subjected to severe strain at room temperature in the Bulge Tester by firmly clamping the edge portion of each disc around the periphery of a die cavity and pressing a rounded punch onto the center portion of each disc to form a bulge within the die cavity. The discs were stretched as the punch descended into the cavity. Where the deformation was beyond the ability of the disc to undergo uniform strain, the strain was localized and crazing or fractures resulted. The deformed iron-aluminum diffusion alloy coated disc and the hot-dip aluminum coated disc were then subjected to heating in an oxidizing atmosphere (i.e. air) at a temperature of 816° C. (1500° F.) for 420 hours. The hot-dip metallic aluminum surface coated strip showed extensive oxidation damage (darkened area) and scaling over all areas of the panel with more than 5% strain (See FIG. 4b), whereas only extremely minor oxidation is evident in any of the stressed area of the solid solution iron-aluminum diffusion alloy coated panel (See FIG. 4a). A strain diagram of the diffusion powder aluminum coated steel strip of FIG. 4a is shown in FIG. 5. The strain diagram of FIG. 4b is substantially as in FIG. 5.

The preferred operating conditions for diffusion heat treating a titanium-containing aluminum killed low carbon steel strip having all the carbon combined with titanium and provided with an aluminum powder-resin (90:10) dry film coating about 22 $\mu$m (0.9 mil) thick comprise heating the dry powder aluminum-resin coated strip in an annealing chamber in open coil form (or tight wound coil form) under a non-oxidizing atmosphere (i.e. in an inert or reducing atmosphere) for about 40 hours at a temperature of about 816° C. (1500° C.) so as to provide a diffusion alloy coating having an aluminum surface concentration of about 10 wt. percent aluminum. The solid solution iron-aluminum diffusion alloy coating thus formed is directly bonded to the titanium containing low carbon steel strip with no sub-surface intermetallic layer or other visible steel interface layer and no significant carbon build up (i.e. sub-surface carbon enriched zone) or inclusions visible at 250X magnification in the diffusion alloy coating (See FIG. 6). The diffusion coated strip exhibits good ductility and high-temperature oxidation resistance when heated for a prolonged period at 816° C. (1500° F.) after being severely deformed at room temperature. And, when exposed to non-aqueous environments to which aluminum coatings are conventionally resistant, such as in sulfidation and carburization environments, the iron-aluminum diffusion alloy coating will exhibit good resistance to corrosion.

When preparing iron-aluminum diffusion alloy coated steel strip material which must have good room temperature formability and oxidation resistance at temperatures about 704° C. (1300° F.) and up to about 982° C. (1800° F.), the low carbon steel base which preferably but not necessarily is aluminum killed should have a small amount of titanium sufficient to chemically combine with all the carbon in the steel. The low carbon steel should have a carbon content below about 0.25 weight percent and usually between about 0.001 weight percent carbon to about 0.1 weight percent carbon. An aluminum killed low carbon steel will generally contain between about 0.01 to 0.08 weight percent carbon, about 0.2 to 0.8 weight percent manganese, a maximum of about 0.03 weight percent sulfur, a maximum of about 0.015 weight percent phosphorus, about 0.05 weight percent silicon, a maximum of about 0.10 weight percent aluminum, and the balance being essentially iron with the usual amounts of residual impurities. If the steel is vacuum degassed, the concentration of carbon and all metalloids and residuals in the steel are maintained at a very low level. A typical titanium-containing aluminum killed low carbon steel used in the present invention has the following approximate composition on a weight basis: Carbon 0.04 percent, Manganese 0.25 percent, Sulfur 0.02 percent, Phosphorous 0.02 percent, Silicon 0.05 percent, Aluminum 0.05 percent, titanium 0.45 and the balanced essentially iron and incidental impurities.

Figure 6:
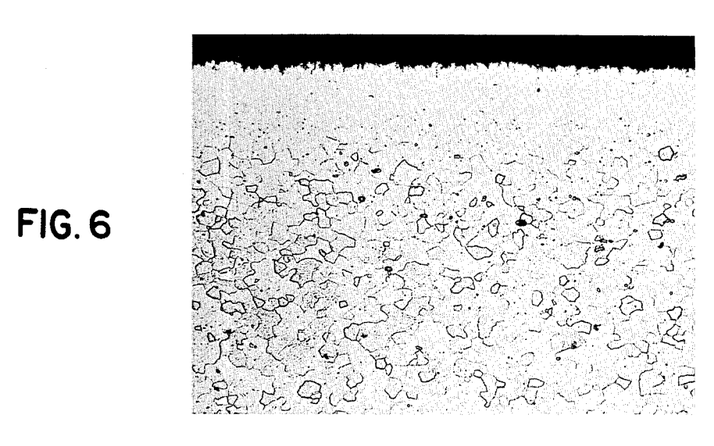
FIG. 6 is a photomicrograph of a cross-section of a steel strip (250X with 4% nital etch) which has a solid solution iron-aluminum diffusion alloy coating with an aluminum surface concentration of about 10 wt.% and which has all the carbon in the steel combined with titanium and made by diffusion heat treating a titanium-containing aluminum killed low carbon steel strip having a dry resin-powder aluminum coating.

FIG. 6 of the drawing is a photomicrograph (250X with 4% nital etch) of a typical low titanium alloy aluminum-killed low carbon steel panel in which all of the carbon in the steel is combined with titanium and which has a solid solution iron-aluminum diffusion alloy coating with an aluminum surface concentration of about 10 wt. percent aluminum made in accordance with the present invention by heating the steel panel having a dry powder aluminum-resin (90:10 ratio) coating about 22 μm thick for 40 hours in a non-oxidizing atmosphere at a temperature of 816° C. (1500° F.).

Figure 7:
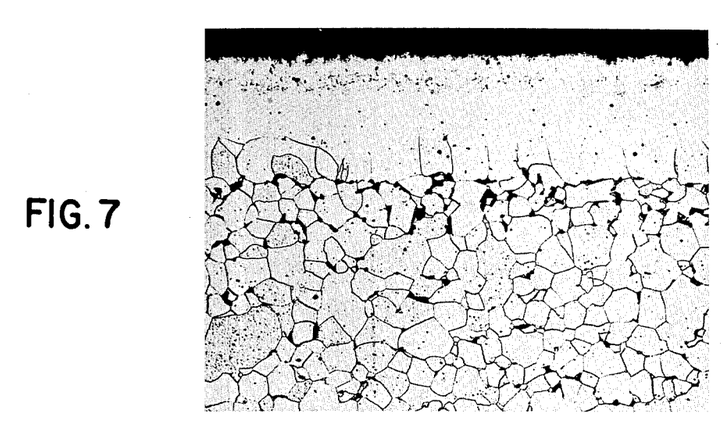
FIG. 7 is a photomicrograph of a cross-section of a steel strip (250X with 4% nital etch) which has a solid solution iron-aluminum diffusion alloy coating with an aluminum surface concentration of about 10 wt.% and which does not have carbon in the steel combined with titanium and made by diffusion heating an aluminum killed low carbon steel strip having the same dry resin-powder aluminum coating as in FIG. 6.

FIG. 7 of the drawing is a photomicrograph (250X with 4% nital etch) of an iron-aluminum diffusion alloy coating formed on an aluminum killed low carbon steel which does not have the carbon in the steel combined with titanium by diffusion heating an identical dry powder aluminum-resin coating as in FIG. 4. The iron-aluminum diffusion alloy coating on the aluminum killed low carbon steel panel of FIG. 7 exhibits some stratification in contrast with the uniform diffusion of the powder aluminum coating on the titanium-containing aluminum killed low carbon steel panel of FIG. 6.

The terms "low titanium alloy" steel and "titanium containing" steel are used herein to designate a steel containing an amount of titanium at least 4 times the carbon content of the steel in order to have all the carbon in the steel chemically combined with titanium and but can have as much as 10 times the wt. percent carbon in the steel. It is preferred but not required that the titanium containing steel have a small excess (i.e. about 0.1 to 0.3 wt. percent) of uncombined titanium in the steel. And, as the carbon content of the steel used in the present invention is relatively small and generally less than 0.1 percent by wt. carbon, the total amount of titanium required is small and generally not in excess of about 1.0 wt. percent titanium. An amount of titanium greater than the foregoing gives no increased benefit and merely adds to the cost of the steel. The titanium which is added to the low carbon steel combines with all the carbon in the steel to form titanium carbides which in addition to stabilizing the carbon contributes significantly to improving the high temperature strength of the coated product. And, in order to provide sufficient titanium carbide for good high temperature strength, the carbon content of the steel preferably is in excess of about 0.02 wt. percent carbon. The titanium also combines with any uncombined nitrogen and oxygen in the steel, but as the latter elements are present in only very small amounts in a low carbon steel, the titanium required to combine with the nitrogen and oxygen will generally not be significant.

Although titanium is the essential alloying element to be added to the low carbon steel where good room temperature formability and oxidation resistance at temperatures above about 677° C. (1250° F.) is required, it is also within the scope of the invention to add small amounts of other metallic alloying elements, such as molybdenum or columbium, to improve the physical properties of the base steel. However, the secondary alloying element should not impair the oxidation resistance of the steel, and the amount of the secondary alloying elements preferably should not exceed about 2 percent by weight of the steel. Thus, the base steel of the present invention is in every instance a low alloy low carbon steel.

In the specification and claims the term "powder aluminum" or "aluminum coating", where the context does not require otherwise, designates finely divided metallic aluminum and metallic aluminum containing minor amounts of other metals, such as between about 5 to 12 wt. percent silicon, which do not significantly reduce the oxidation resistance characteristic of an aluminum base coatings. Also, the term "ferrous metal" as used in the specification and claims designates a low carbon steel and low alloy steel wherein the added alloying element or elements which are not normally present in a low carbon steel do not exceed a total of about 2 wt.percent of the steel.

The present invention comprises a process for providing metal strips having a ferrous metal base with improved protective resin-powder coatings which are useful in the cured resin state and which can be further processed to provide a ductile, impervious protective metal coating, such as a metallic sinter coating or a solid solution iron-aluminum diffusion alloy coating, and is uniquely adapted for producing in an economical manner with conventional equipment a wide range of coated strip material using relatively inexpensive material which can be used in place of more expensive coated steel and alloy sheet material.

We claim:

1. A method of coating a low alloy steel strip with an adherent protective metal coating which is deformable at room temperature and resistant to oxidation at elevated temperatures comprising:
    (a) applying to a clean surface of a titanium-containing low alloy low carbon steel strip a uniform wet film coating of a finely divided protective metal uniformly dispersed in a synthetic resin binder composition comprised essentially of a synthetic resin and a solubilizing volatilizable organic solvent compatible with said resin;
    (b) said finely divided protective metal being selected from the group consisting of aluminum powder, a mixture of aluminum powder and 5–12 wt.% silicon powder, a powder alloy of aluminum and 5–12 wt.% silicon, and a mixture of aluminum powder and zinc;
    (c) said protective coating metal comprising between about 80 and 88 percent by volume of said wet film and said wet film having a thickness sufficient to form a dry film coating of between about 17.5 μm and 37 μm;
    (d) heating said wet film coating at a temperature which effects volatilizing said solvent and curing said resin to form a flexible dry film on the surface of said strip; and
    (e) heating said dry film in a non-oxidizing atmosphere at an elevated temperature which avoids significantly increasing the grain size of said steel strip for a period sufficient to form an adherent protective surface coating which is deformable at room temperature and which directly contacts the surface of the steel strip without an intervening layer in contact with the steel strip.

2. A method as in claim 1, wherein saidf strip after volatilizing said solvent and resin is heated in an oxidizing atmosphere at a temperature and for a period sufficient to effect formation of oxide bonds between contiguous particles of said finely divided protective metal and oxide bonds between said particles of protective metal and said steel strip, and thereafter heating said strip in a reducing atmosphere at a temperature which avoids significantly increasing the grain size of said steel to form metallic iron bonds between said finely divided protective metal and said strip without formation of a layer of intermetallic iron compound in contact with said steel strip.

3. A method as in claim 1, wherein said dry film is formed essentially of a finely divided aluminum dispersed in said resin and is subjected to a diffusion heat treatment at an elevated temperature in a non-oxidizing atmosphere for a time sufficient to form as the adherent protective surface coating a solid solution iron-aluminum diffusion alloy coating which is deformable at room temperature.

4. A method as in claim 1, wherein said dry film contains aluminum as the main constituent and said low alloy steel strip is a titanium-containing low alloy aluminum killed low carbon steel strip having all the carbon in said steel combined with titanium, and said strip with said dry film is heated in a diffusion heat treating zone having a non-oxidizing atmosphere at a temperature and for a time sufficient to provide a solid solution iron-aluminum diffusion alloy coating deformable at room temperature and having a surface concentration of at least about 8 wt. percent aluminum with said diffusion alloy coating directly bonded to said steel strip without an intervening subsurface layer visible at 250X magnification.

5. A method as in claim 4, wherein said strip having said dry film is heated in said diffusion heat treating zone having a temperature of about 816° C.(1500° F.).

6. A method as in claim 4, wherein said strip having a said dry film containing about 90 wt. percent metallic aluminum powder and about 10 wt. percent said resin and having a dry film thickness of from about 17.5 μm (0.7 mil) to about 37.0 μm(1.5 mil) is heated in a non-oxidizing atmosphere at about 816° C.(1500° F.) for between about 30 and 40 hours to provide said steel strip with a solid solution iron-aluminum diffusion alloy surface coating which has an aluminum surface concentration of from about 8 to about 10 wt. percent aluminum and which is characterized by resistance to oxidation at temperatures between about 704° C.(1300° F.) and about 982° C.(1800° F.) after being severely deformed at room temperature.

7. A method as in claim 1, wherein said finely divided protective metal is selected from the group of oxidation resistant metal powder material consisting of aluminum powder, a mixture of aluminum powder and about 5 to 12 weight percent silicon powder and a powder alloy of aluminum and about 5 to 12 weight percent silicon.

8. A method as in claim 1, wherein said finely divided protective coating material is selected from the group consising of metallic zinc powder and metallic aluminum powder.

9. A method as claimed in claim 8, wherein said protective coating material comprises on a dry basis a mixture of about 55 weight percent powdered metallic aluminum and 45 weight percent powdered metallic zinc and said mixture comprising between about 70 and 95 percent by weight of the dry film with the balance essentially said thermoplastic resin.

10. A method as in claim 1, wherein said resin is a thermoplastic synthetic resin which has a Glass Transition temperature between about 35° C. and 110° C. (95° F. and 230° F.).

11. A method as in claim 10, wherein said thermoplastic resin is an acrylic alkyl ester resin selected from a group consisting of methyl methacrylate copolymer, ethyl methacrylate copolymer, methyl/butyl methacrylate copolymer, and isobutyl methacrylate copolymer.

12. A method as in claim 11, wherein said thermoplastic acrylic alkyl ester resin is ethyl methacrylate copolymer resin having a specific gravity of 0.96, a Glass Transition temperature of about 40° C.(104° F.) and a Tukon hardness value between 10 and 11.

13. A method as in claim 10, wherein said resin is a thermoplastic phenoxy-type resin reaction product of bisphenol-A and epichlorohydrin having a molecular weight between about 20,000 and 35,000.

* * * * *